United States Patent [19]

Hall

[11] Patent Number: 5,628,522
[45] Date of Patent: May 13, 1997

[54] FOOTED CART HAVING NORMALLY DISENGAGED WHEELS

[76] Inventor: Donald M. Hall, P.O. Box 1247, 19 Progress St., Kingston, N.Y. 12401-0119

[21] Appl. No.: 613,978

[22] Filed: Mar. 11, 1996

Related U.S. Application Data

[63] Continuation of Ser. No. 194,083, Feb. 3, 1994, abandoned.

[51] Int. Cl.⁶ ........................................ B62B 3/02
[52] U.S. Cl. .................. 280/43.17; 280/46; 280/43.14
[58] Field of Search ................... 280/43.14, 43.17, 280/43.22, 43.24, 79.3, 46, 30

[56] References Cited

U.S. PATENT DOCUMENTS

| | | | |
|---|---|---|---|
| 79,571 | 7/1868 | Hewitt et al. | 280/43.14 |
| 770,152 | 9/1904 | Bechtel | 280/43.22 |
| 1,082,160 | 12/1913 | Kurowski . | |
| 1,280,795 | 10/1918 | Martin | 280/46 |
| 1,733,029 | 10/1929 | Plant | 280/30 |
| 1,999,106 | 4/1935 | Muller . | |
| 2,185,073 | 12/1939 | Chamberlain . | |
| 2,319,581 | 5/1943 | Brownlee et al. . | |
| 2,628,068 | 2/1953 | Sehnert . | |
| 2,672,349 | 3/1954 | Brock . | |
| 2,783,055 | 2/1957 | Michaud . | |
| 2,812,189 | 11/1957 | Geldhof . | |
| 2,814,498 | 11/1957 | Hull . | |
| 2,874,971 | 2/1959 | Devery | 280/46 |
| 2,878,029 | 3/1959 | Dahmen et al. . | |
| 2,964,327 | 12/1960 | Mohr . | |
| 3,054,623 | 9/1962 | Simpkins . | |
| 4,555,827 | 12/1985 | St. Louis | 280/43.14 |
| 4,815,760 | 3/1989 | Dooley | 280/43.24 |

FOREIGN PATENT DOCUMENTS

| | | | |
|---|---|---|---|
| 95313 | 7/1922 | Switzerland | 280/46 |
| 96801 | 11/1922 | Switzerland | 280/46 |
| 101545 | 10/1923 | Switzerland | 280/46 |

*Primary Examiner*—Brian L. Johnson
*Assistant Examiner*—Min Yu
*Attorney, Agent, or Firm*—Shlesinger, Arkwright & Garvey, L.L.P.

[57] ABSTRACT

A cart includes a frame, a leg attached to the frame, and a wheel movable relative to the frame. A handle is operatively associated with the wheel and with the frame, whereby the work surface is in a normally stationary, inoperative position, and positive movement of the handle causes the wheels to engage the floor and place the work surface in an operative, movable mode. The work surface is engineered so that it is automatically returned to its stationary mode when no user is actively placing the work surface in its movable mode.

12 Claims, 3 Drawing Sheets

5,628,522

FOOTED CART HAVING NORMALLY DISENGAGED WHEELS

This application is a continuation of application Ser. No. 08/194,083, filed Feb. 3, 1994, now abandoned.

FIELD OF THE INVENTION

This invention relates to movable work surfaces, such as carts, and in particular to normally stationary work surfaces and landing gears therefor.

BACKGROUND OF THE INVENTION

Previous attempts have been made to construct devices for moving normally stationary objects around.

Most known devices for moving around carts, washing machines and the like, are difficult to use and require lots of physical strength to move such carts and/or objects over a support surface, such as a floor.

U.S. Pat. No. 2,319,581 to Brownlee et al. discloses an article of furniture having a movable handle which has a locked, engaged position as well as a locked disengaged position for bringing wheels into and out of engagement with the floor. A user must apply somewhat outward and upward force to the Brownlee et al. handle for moving the wheels from the disengaged position to the engaged position. Hence,, considerable upper body strength is required of a user who wishes to move the Brownlee et al. furniture when a heavy object is supported thereon. Likewise, the Brownlee et al. device, being locked in either one of engaged and disengaged positions, will have a tendency to move when left unattended on a sloped support surface in its wheel-engaging position.

U.S. Pat. No. 2,783,055 to Michaud discloses a vertically adjustable wheeled supporting frame for cabinets and the like. The Michaud wheeled supporting frame includes a lever which must be rotated upwardly for causing rollers to engage the floor. A stud is provided on the Michaud device for releasably retaining the lever and locking the wheels in their engaged position. Thus, the Michaud frame has some of the drawbacks of the above-described Brownlee et al. device.

U.S. Pat. No. 2,812,189 to Geldhof discloses a caster jack assembly for automatic washing machines that includes a lever rotatably attached to a frame inserted under washing machines for assisting in the movement thereof. The Geldhof lever is rotatable for movement between respective ones of two locking pins, one locking pin retaining the caster jack assembly in a lowered position in which the washing machine is in direct engagement with the floor, and a second locked position in which the caster jack assembly is used to raise the washing machine off the floor for moving the machine from place to place. A spring is provided in the Geldhof device for acting as a counterweight during the lifting operation for compensating for the weight of the washing machine to be moved and enabling the user to lift the machine for rolling on its casters over the floor with very little manual effort. However, the Geldhof handle must be moved upwardly against the force of gravity.

A two-wheeled mobile workbench is disclosed in U.S. Pat. No. 2,672,349 to Brock. The Brock device includes a rotatable lever which must be moved upwardly by a user in order to force the Brock wheels against the floor for raising the workbench in order to move it to a different location. The Brock device apparently requires a fair amount of upper body strength on the part of the user in order to raise the lever and engage the wheels against the weight of the mobile workbench.

Accordingly, there is a need for a mobile work surface or cart which overcomes the drawbacks of prior art devices. There is a need for a footed cart having normally disengaged wheels which can be operated with relatively little effort on the part of the user, yet which is able to carry heavy loads, has few moving parts for enhancing the reliability thereof, and which automatically returns to its normally ground-engaging, non-moving position when the user is not actively causing the cart to be in its movable or operative mode.

Terms such as "cart" and "ground" are for convenience only, as all table-like devices, movable work surfaces, and platforms, for example, are intended to be within the scope of the invention, and my invention is expected to be usable on all manner of supporting surfaces.

OBJECTS AND SUMMARY OF THE INVENTION

It is a first object of the invention is to provide a device which is easily moved from one location to another.

Another object of the invention is to provide a work surface which is movable relative to the floor, yet which can be placed in a non-moving, stationary mode.

Yet another object of the invention is to provide a work surface which can be moved by an operator having relatively little upper body strength.

A further object of the invention is to avoid having a large number of moving parts, and complicated locking mechanisms.

A still further object of the invention is to provide a normally stationary wheeled cart, which is readily moved, and yet which automatically returns to its stationary mode when left unattended by an operator.

It is yet another object of the invention to provide a movable work surface which overcomes the drawbacks of conventional devices.

Still another object of the invention is to provide a movable cart which is easy to manufacture, has few moving parts, and, hence, has greater reliability than conventional carts.

Yet another object of the invention is to provide a cart which is mechanically stable even when used on an irregular support surface.

A yet still further object of the invention is to provide a movable cart having a compact construction.

A still further object of the invention is to provide a movable work surface particularly suited for use in work environments in which cleanliness and hygiene are important, and are achieved owing to the simple and readily cleaned construction thereof.

Another object of the invention is to provide a movable cart which can be operated without the use of force-multiplying components, such as hydraulic pistons and actuators, owing to the geometry of the cart.

Still another object of the invention is to provide a movable work surface, which is capable of supporting heavy objects, and which can be moved from place to place, even when loaded, by a user having relatively little strength.

It is yet another object of the invention to provide a movable work surface having components which are all replaceable in the field without any great degree of skill on the part of the user.

In summary, therefore, the invention is directed to a movable work surface which is easy to operate, has few moving parts, is reliable, takes advantage of ergonomic considerations, and is hygienic.

In one preferred embodiment of the invention, the cart includes a frame, a leg attached to the frame, and a wheel movable relative to the frame. A handle is operatively associated with the wheel and with the frame, whereby the work surface is in a normally stationary, inoperative position, and positive movement of the handle causes the wheels to engage the floor and place the work surface in an operative, movable mode. The work surface is engineered so that it is automatically returned to its stationary mode when no user is actively placing the work surface in its movable mode.

The invention will be further described with reference to the following drawings.

DETAILED DESCRIPTION OF THE INVENTION

Figure 1:
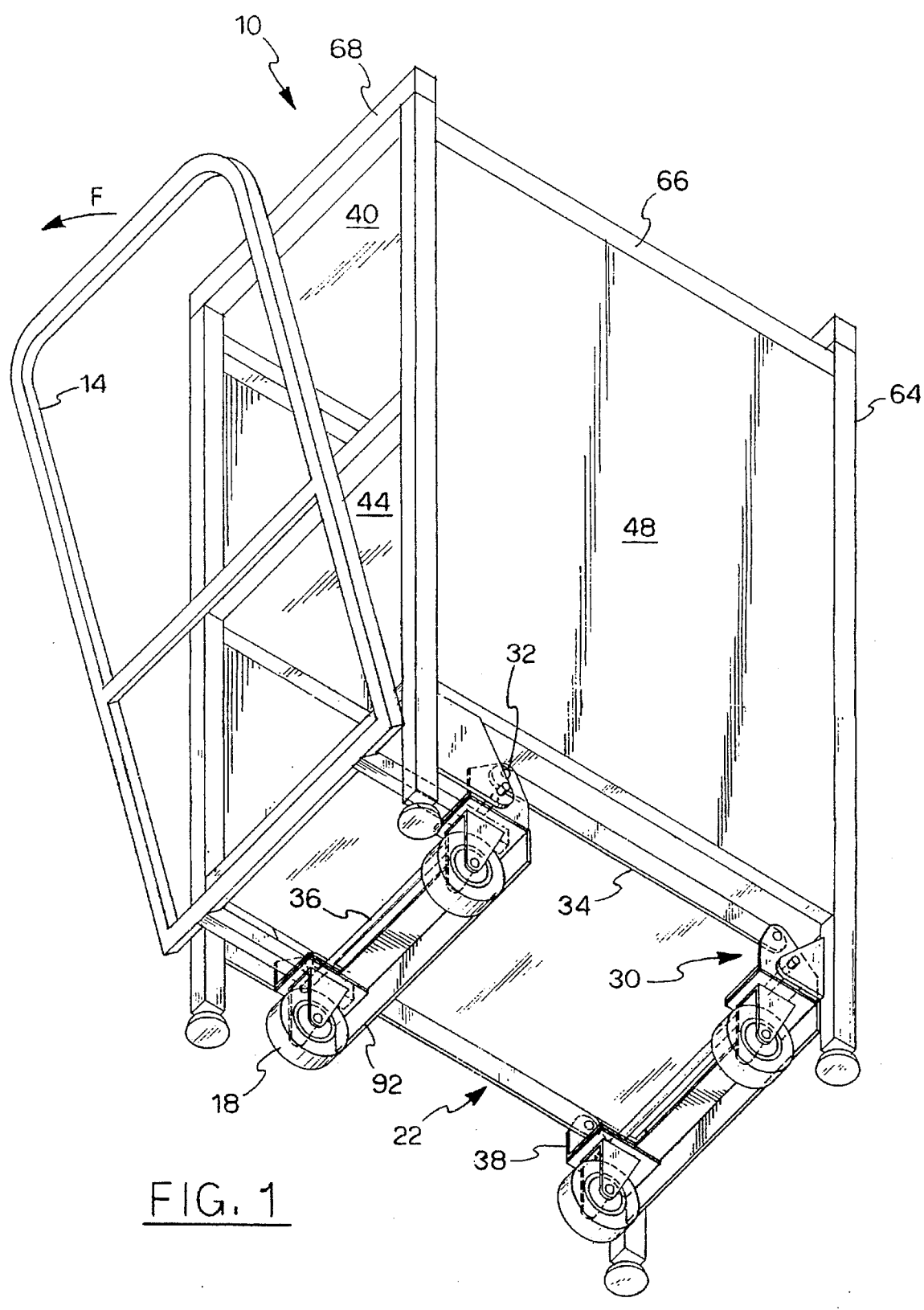
FIG. 1 is a perspective view, from below, showing a movable table according to a preferred embodiment of the invention.
Figure 2:
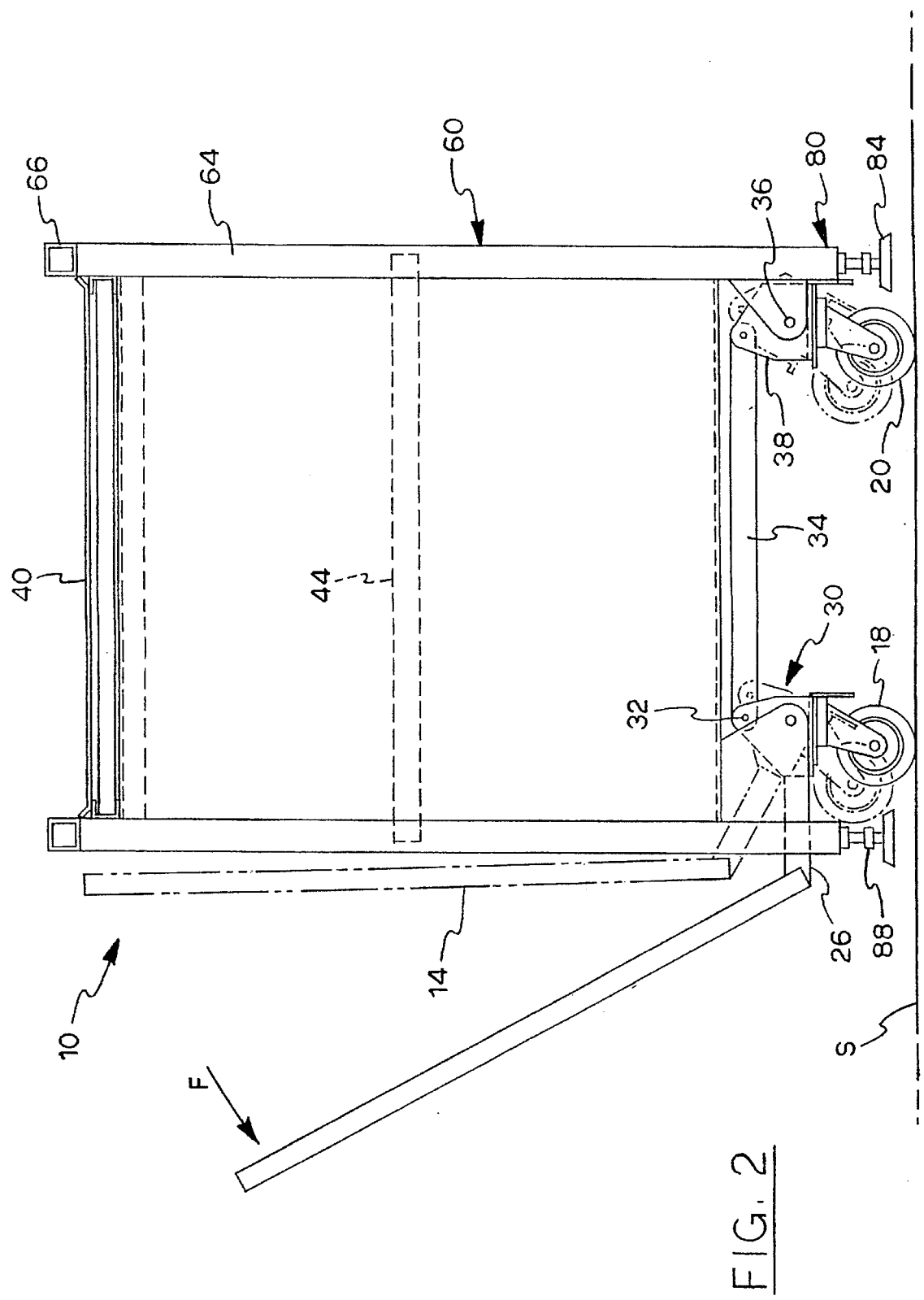
FIG. 2 is a side elevational view of the movable table of FIG. 1.

FIGS. 1 and 2 illustrate a movable work table 10 according to a preferred embodiment of the invention.

Movable work table 10 includes a handle 14, a pair of rear wheels 18, and a pair of front wheels 20. Good results have been achieved when rear wheels 18 are provided as swivel type caster wheels, and front wheels 20 are provided as rigid, non-swiveling wheels.

A support frame 22, which may also be termed a landing gear frame, for example, is integrally provided at the lower portion of movable work table 10, or as a separate add-on element for retrofitting existing, non-movable tables, for example.

One or more connecting members 26 extend between and connect handle 14 and a linkage 30. Linkage 30 includes a fastener 32 functioning as a pivot point, a tie rod 34, and a plurality of front and rear pivot plates 38. It is contemplated that connecting member 26 will rigidly join handle 14 and rearmost pivot plates 38, such as by bolting or welding respective connection points and interfaces.

A pivot element, such as a rod 36, allows plates 38 to rotate relative to the remainder of cart 10. Hence, wheels 18 and 20 are rotatable relative to cart 10. Rods 36 may extend substantially across the width of cart 10, as illustrated, for providing additional structural integrity, or rods 36 may be provided as two short rods disposed on respective left and right sides at one or both of the front and rear of cart 10. It is likewise contemplated that other fasteners such as nuts and bolts, and rivets be utilized as pivot points, for example.

When the invention is in the form of the illustrated work table 10, there is provide an upper work surface 40. Likewise, a lower work surface 44, as well as one or more side walls 48 may be provided.

Work table 10 further includes a main frame 60 having uprights 64, lengthwise frame member 66, and lateral frame members 68.

A plurality of rigid legs 80, preferably formed as rigid extensions of uprights 64, include support feet 84. It is expected that adjustment elements 88 will be provided for fine-tuning the relationship between wheels 18, 20 and support feet 84, depending on the type and quality of the expected support surface S and the intended use of movable work table 10.

A rigidifying element 92 may be provided extending between respective ones of front and rear pivot plates 38. For ease of cleaning, and for use in the food service industry, for example, it is preferred that rigidifying element 92 be in the form of a downwardly extending flange. Such a downwardly extending flange ensures that unwanted material will not collect on an upper face of pivot plates 38, for example.

Figure 3:
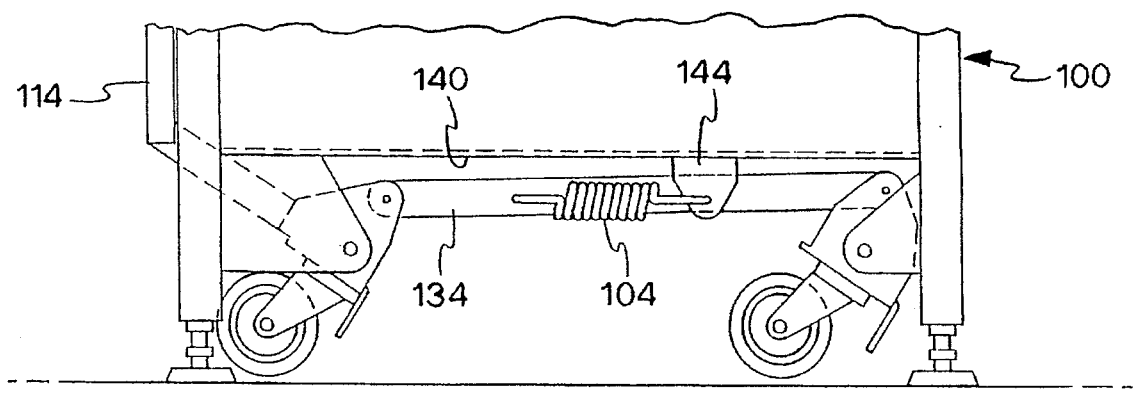
FIG. 3 is a side elevational view, similar to FIG. 2, of another preferred embodiment of the movable table according to the invention, in its typical, stationary mode.

Turning to FIGS. 3 and. 4, there is shown a movable work table 100 according to a further preferred embodiment of the invention.

Movable work table 100 includes a multipurpose spring 104 which is located and normally biased for returning a handle 114 to its non-use position adjacent to the rear of table 100.

Spring 104 resiliently connects a tie rod 134 to a lower portion 140 of table 100.

A support 144 may be attached to lower portion 140 to provide a convenient attaching location for the front end of spring 104. Spring 104 not only ensures that handle 114 is returned to a fully upright position out of the way of users, but likewise further upwardly biases wheels 118 to make it easier to clean between wheels 118 and support surface 8, for example.

Figure 5:
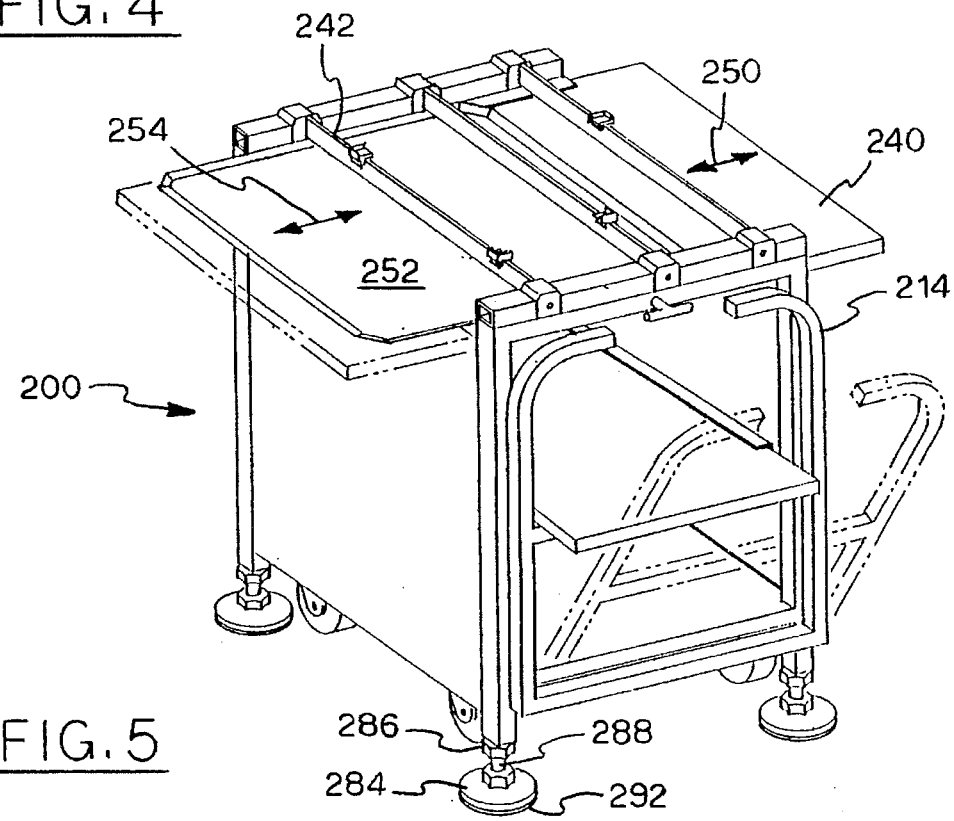
FIG. 5 is a perspective view, from above, of a yet still further preferred embodiment of a movable work surface according to the invention.

FIG. 5 illustrates yet another preferred embodiment of a movable work table 200 according to the invention.

A handle 214 is pivotably attached as in the previously described embodiments. In a typical application in the food service industry, there can be provided a movable work surface 240 above which adjustable beams 242 are provided, and which work surface 240 is movable in the direction of arrow 250. Also, there may be provided a tray 252 movable in the direction of arrow 254.

A plurality of support feet 284 are relatively large, as compared with the above-described embodiments, and extend outwardly past the footprint of the main body of table 200. Such support feet 284 provide additional stability when heavy objects, such as a meat slicer (not shown) are supported on adjustable beams 242.

Adjustment of support feet 284 relative to legs 280 is accomplished by the provision of one or more adjustment nuts 286 movably disposed on a threaded shaft 288. It is expected that a pad 292 will be provided on a lower surface of support feet 284 to enhance the effectiveness thereof.

OPERATION

The operation of each of the preferred embodiment of FIGS. 1–5 is generally the same, and the use of movable work table 10 of the preferred embodiment of FIGS. 1 and 2 will be described in detail.

FIGS. 1 and 2 illustrate the location of handle 14 when a downward and outward force F is applied by the user. Handle 14 is preferably configured so that force F may be provided chiefly by the user taking advantage of his or her body weight, as opposed to the lifting of handles by arm muscles as is required in conventional devices.

Such downward force F causes handle 14 to move from the phantom line position of FIG. 2 to the solid line positions of FIGS. 1 and 2 in a counterclockwise direction. Hence, connecting member 26 likewise rotates in a counterclockwise direction relative to pivot rod 36. The movement of connecting member 26, owing to its being fixedly attached to pivot plate 38, moves pivot point 32 rearwardly. Concurrently, tie rod 34 is moved rearwardly along with forward pivot plate 38.

Thus, wheels 18 and 20 are likewise rotated counterclockwise relative to pivot rod 36 into engagement with support surface S.

Continued counterclockwise movement of handle 14 results in the lifting of legs 80, along with the remaining elements of work table 10, off of support surface 8.

Work table 10 may now be moved to a different location by exertion of forward forces by the operator. It will be appreciated that in the operative position of handle 14 shown in solid line in FIGS. 1 and 2, the handle is in an ergonometrically desirable location for the typical operator to push and steer table 10.

When the desired new location has been reached, the operator releases handle 14, removing force F, whereby the force of gravity causes the bulk of the weight of table 10 to act on wheels 18 and 20, thereby rotating the wheels counterclockwise, along with connecting member 26, and handle 14, relative to the remainder of table 10, wherein handle 14 is automatically returned to its typical, substantially upright, non-use position. As will be appreciated, wheels 18 and 20 are moved upwardly and relative to the remainder of table 10 until support feet 84 have contacted support surface S.

Figure 4:
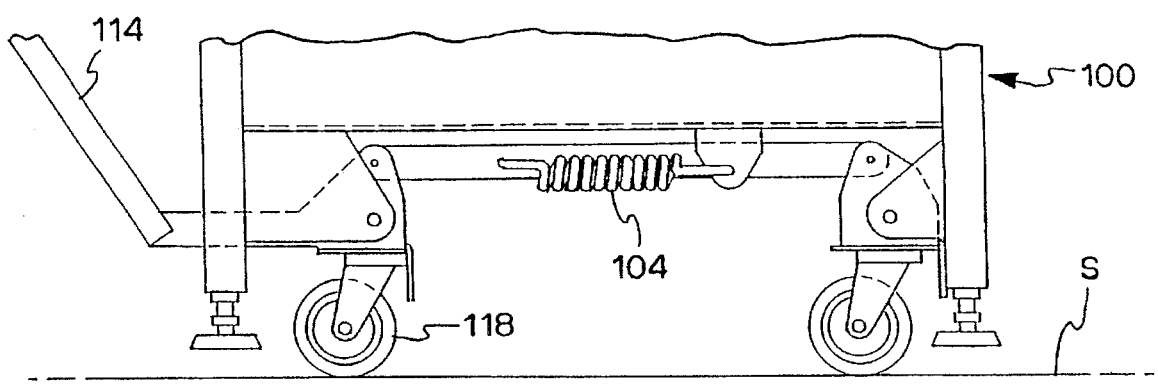
FIG. 4 shows the further preferred embodiment of the work table of FIG. 3, when a force is being applied to the handle, and the table is in its movable mode.

The operation of work table 100 illustrated in FIGS. 3 and 4 is generally the same as the operation of the embodiment of FIGS. 1 and 2.

It is contemplated that spring 104 will be sized so that its function is to ensure handle 114 is returned to its non-use position shown in FIG. 3.

Spring 104 is useful when the irregularities of surface S might cause handle 114 to not be fully returned to its upright position.

Spring 104 can likewise be sized to make sure that any irregularities in the geometry and location of the pivot points, assembly of the linkages, and frictional forces, which may contribute to handle 114 not being fully returned to its non-use position, will be overcome by the force of spring 104.

Still further, spring 104 is expected to function as the means by which wheels 118 are raised entirely off the floor to allow for cleaning underneath the wheels when work table 100 is in its nonuse position.

This use of spring 104 differs from the embodiment of FIGS. 1 and 2, in which gravity is generally the sole force acting on the wheels, and the wheels in the embodiment of FIGS. 1 and 2 are typically always in contact with the support surface.

FIG. 5 generally illustrates the typical application of movable work table 200 in a delticatessen or grocery store, for example, and will be provided with or without springs as the intended use dictates.

It is likewise contemplated that the adjustable feet in all embodiments will be engineered and assembled so that the feet cannot be adjusted upwardly to a point where the wheels engage the floor when the wheels are in the non-moving retracted position. Such configuration and adjustment of the adjustable feet ensures that the feet cannot be deployed in a position that would allow the wheels to remain in operative contact with the ground even when the handle is in its fully retracted, non-use position.

The mounting of the adjustable feet is likewise engineered so that the table can be leveled when the floor is uneven.

The geometry of the handle and the linkages for actuating the wheels is such that leverage is maximized for significantly reducing the force required for an operator to lift the table. The amount of lift of the table accomplished by movement of the handle is sufficient to elevate the feet for clearing obstacles typically encountered in a commercial environment.

It is likewise contemplated that the pivot point(s) will be varied for adjusting the leverage factor, whereby the force required to actuate the handle will increase or decrease to match the intended load range of the table.

The materials used in the lower frame and linkages can be different from those used in the handle. For example, the handle can be stainless steel and the other associated elements can be carbon steel. Carbon steel and stainless steel can be welded together, or the components can be assembled with bolts, or rivets, or other conventional fastening means.

The handle itself is expected to be of a single pole type, for example, in addition to the illustrated U-shaped and double ski pole configurations.

It is further contemplated that two wheels or casters be used at the front of the table (i.e., at a location distant from the handle) and the table would have a total of two (as opposed to four) wheels in its landing gear assembly. Such a configuration would further simplify the overall device. Such a configuration would typically have two feet and two casters engaging the ground when the casters are in the retracted, non-use position.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. A cart comprising:
  a) a frame having a front and a rear;
  b) at least one leg attached to said frame and extending away from said frame for normally engaging a support surface;
  c) at least two wheels movably attached to said frame, said at least two wheels including a front wheel and a rear wheel movable between respective operative and inoperative positions;
  d) said at least two wheels extending away from said frame, and said at least two wheels normally being in said inoperative position substantially free of contact with the support surface;
  e) a handle attached to said at least two wheels;
  f) said handle being normally disposed in an inoperative position in which said at least two wheels are substantially free of contact with the support surface;
  g) said handle being movable relative to said frame to an operative position in which said at least two wheels are moved to said operative position of said at least two wheels, said operative position of said at least two wheels being a support-surface engaging position in which said at least two wheels support said cart for movement relative to the support surface;

h) a linkage attached to said handle and to said at least two wheels, said linkage being configured for causing said at least two wheels to return from said operative position of said at least two wheels under the force of gravity, and for causing said handle to move from said operative position of said handle to said inoperative position of said handle under the force of gravity; and i) said linkage including:
1) front and rear pivot elements disposed on said at least one leg on said frame at said front and rear thereof, respectively;
2) front and rear pivot plates pivotably attached to said front and rear pivot elements, respectively;
3) said front and rear wheels being attached to said front and rear pivot plates, respectively;
4) front and rear pivot points disposed on said front and rear pivot plates, respectively;
5) said front and rear pivot points being laterally offset from said front and rear pivot elements, respectively;
6) a tie rod disposed between said front and rear pivot plates, and being pivotably attached to said front and rear pivot points, respectively; and
7) a connecting member disposed between and substantially rigidly connecting said rear pivot plate to said handle.

2. A cart as defined in claim 1, wherein:
a) said front and rear pivot points are vertically offset from said front and rear pivot elements, respectively.

3. A cart as defined in claim 2, wherein:
a) said front and rear pivot points are rearwardly offset from said front and rear pivot elements, when said at least two wheels are in said operative position.

4. A cart as defined in claim 2, wherein:
a) at least one of said front and rear wheels is a caster wheel.

5. A cart as defined in claim 1, wherein:
a) said cart is free of locking devices for causing said handle to maintain its operative position only when a force acting against the force of gravity is being applied thereto and for preventing locking of said handle and said linkage in their respective operative positions.

6. A cart as defined in claims 1, wherein:
a) said handle is disposed substantially rearwardly of said frame.

7. A cart as defined in claim 1, wherein:
a) said handle extends substantially adjacent to said frame in said inoperative position of said handle.

8. A cart as defined in claim 1, wherein:
a) a spring extends between said linkage mechanism and said frame for returning said handle to said inoperative position of said handle.

9. A cart as defined in claim 1, wherein:
a) said handle has a substantially inverted U-shaped configuration.

10. A cart as defined in claim 1, wherein:
a) at least one of said at least two wheels is a caster wheel.

11. A cart as defined in claim 1, wherein:
a) at least one of said at least two wheels is a non-swiveling wheel.

12. A cart as defined in claim 1, wherein:
a) said handle extends outwardly away from said frame when in said operative position of said handle.

* * * * *